April 3, 1956 K. W. HARRISON ET AL 2,740,944
MOUNTING ARRANGEMENTS FOR ELECTRICAL APPARATUS
Filed Oct. 10, 1951 5 Sheets-Sheet 1

INVENTORS
Kenneth W. Harrison
Malcolm Simons
BY
Young, Emery & Thompson
ATTORNEYS

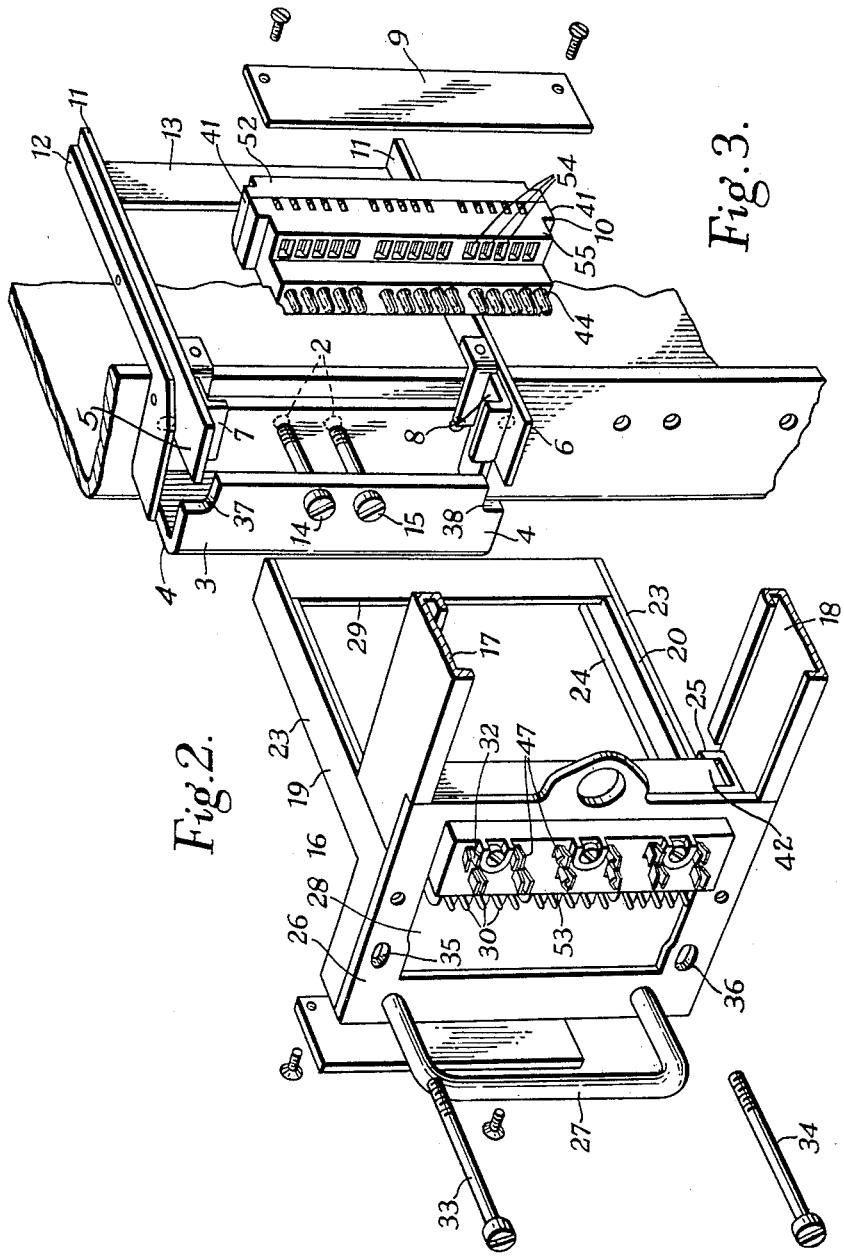

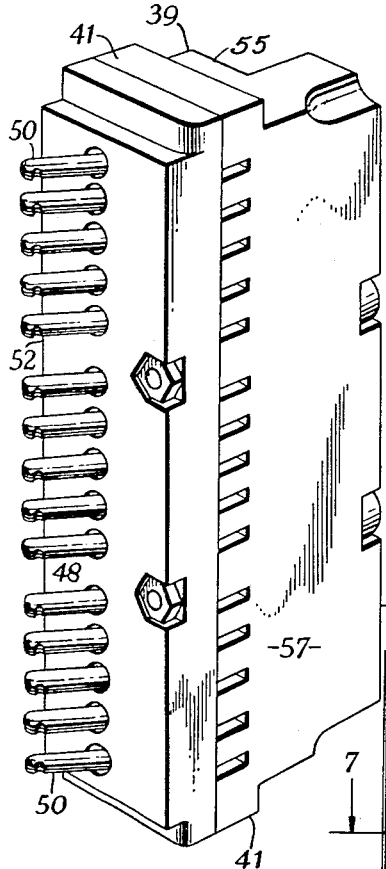
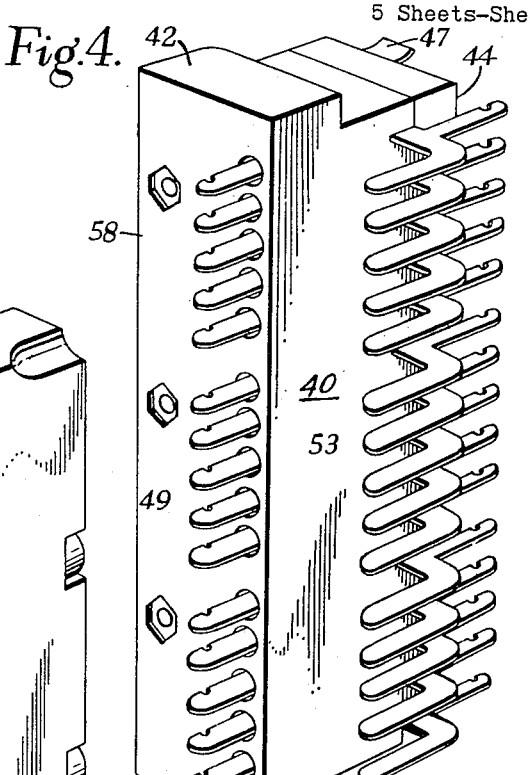
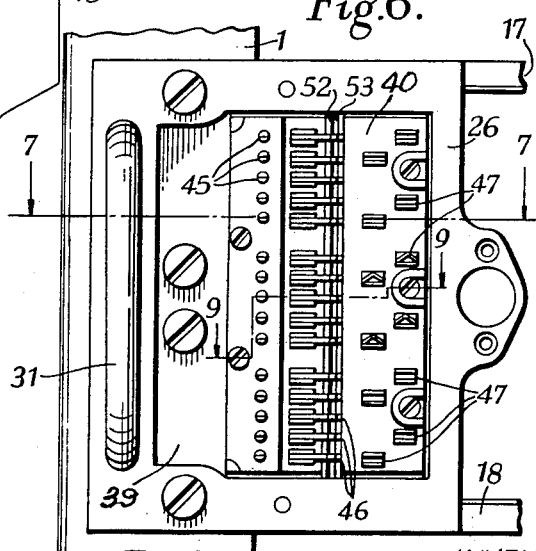

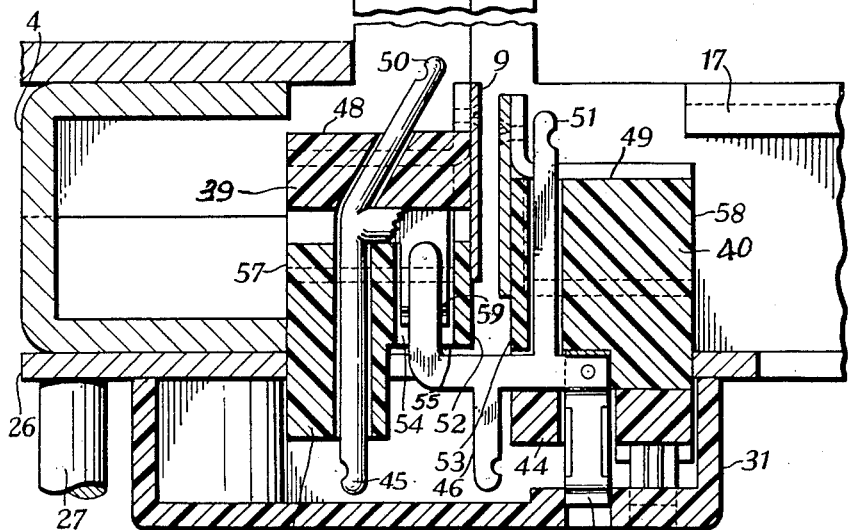
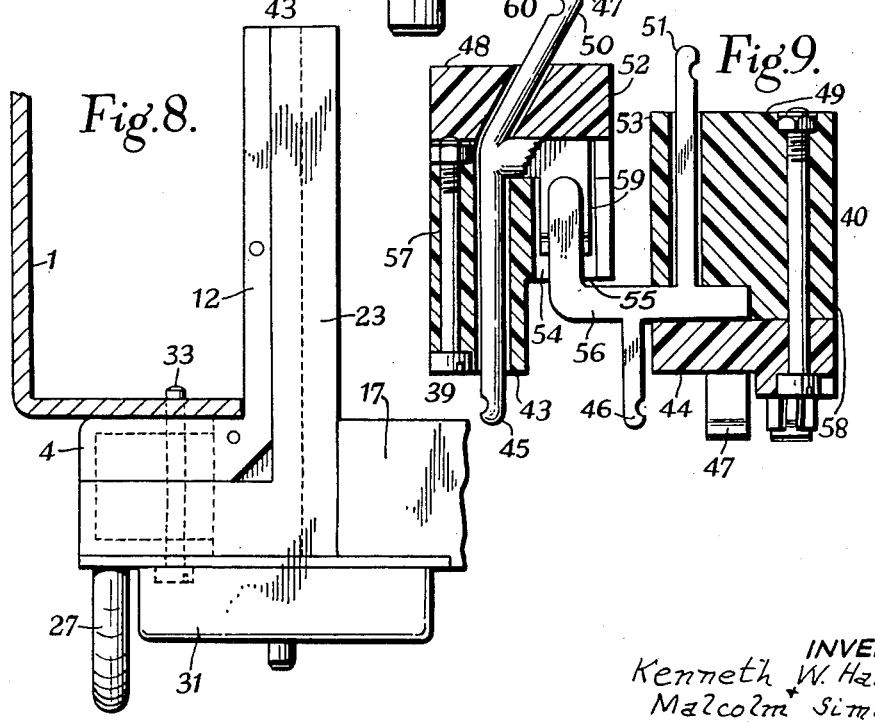

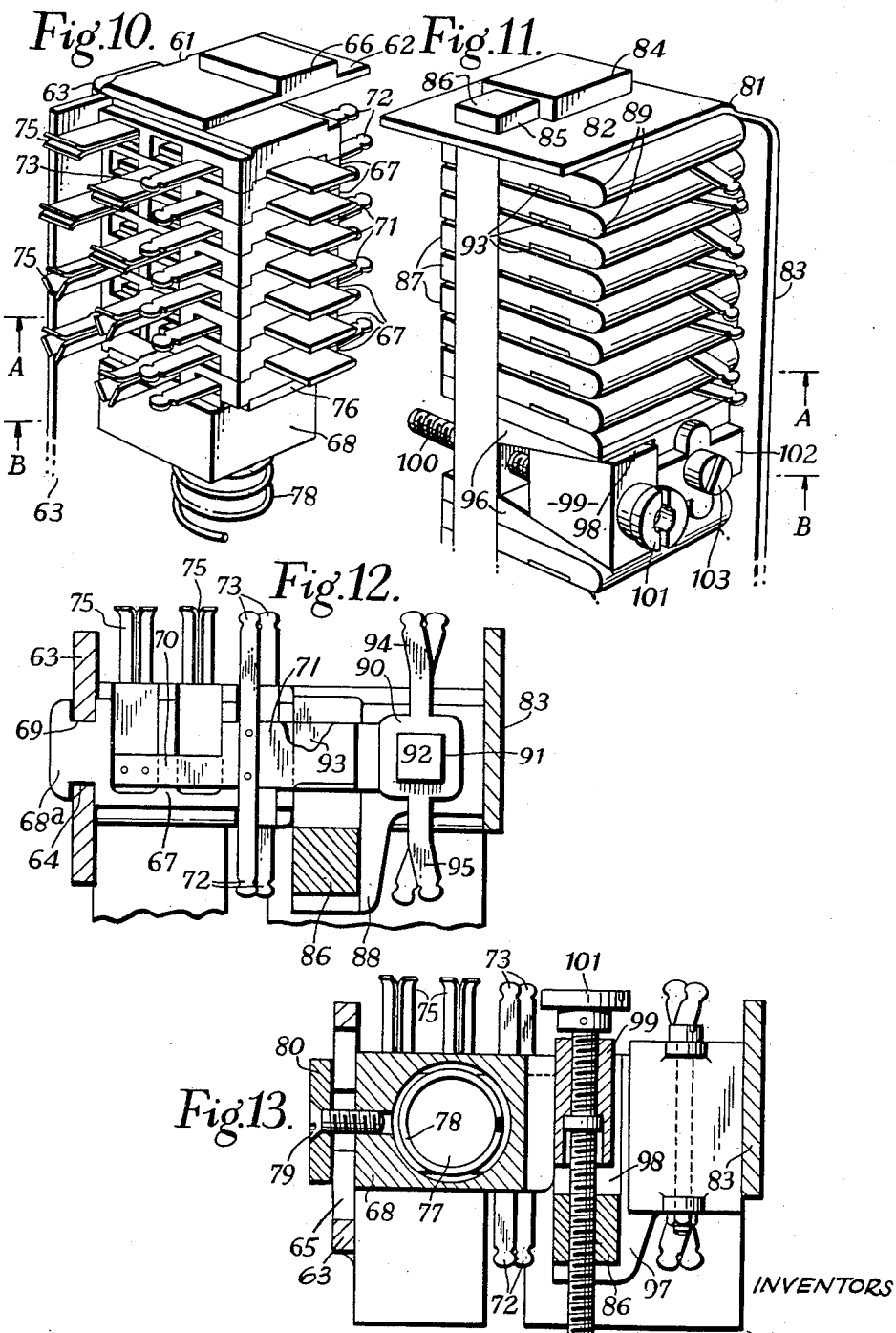

United States Patent Office 2,740,944
Patented Apr. 3, 1956

2,740,944

MOUNTING ARRANGEMENTS FOR ELECTRICAL APPARATUS

Kenneth Whiteley Harrison and Malcolm Simons, Orpington, England, assignors to Telephone Manufacturing Company Limited, Orpington, England, a British company Application October 10, 1951, Serial No. 250,702

Claims priority, application Great Britain October 17, 1950

4 Claims. (Cl. 339—192)

The present invention concerns improvements in or relating to electrical plug and socket couplings and to mounting arrangements for electrical apparatus in which use is made of such couplings.

In plug and socket couplings which are used with many kinds of electrical apparatus it is usual practice for the interengaging parts of the coupling to be placed more or less to the rear where they are entirely hidden from view when the apparatus is in position, so that access to the said parts of the coupling can only be made when the apparatus is removed from its mounting. Such invisibility and inaccessibility of the interengaging parts is desirable in many cases on grounds of safety and to prevent interference with the current carrying parts.

It is a disadvantage, however, with certain types of electrical equipments, for example in telephone installations, where it is desirable to make tests for faulty components from the elements of the coupling without removing the apparatus and particularly where the removal of the apparatus involves some difficulty or trouble such as the opening of soldered connections.

It is an object of the present invention to provide a plug and socket coupling wherein the degree of visibility and accessibility of the interengaging parts is as great as possible during and after completion of the coupling.

It is a further object to provide a panel and rack mounting for electrical equipment employing plug and socket couplings of this kind, and in which the plug and socket members are accessible for testing and inspection when the panel is in position.

According to one feature of the invention, in an electrical plug and socket coupling the interengaging conducting elements are adapted to be engaged by a lateral movement of one half of the coupling with respect to the other in a direction at right-angles to the direction in which the conducting elements of the plug member project from the surface thereof.

According to a further feature of the invention a connecting and mounting arrangement for electrical apparatus comprises a framework on which are mounted one or more of separately detachable panel-like members to which electrical apparatus is secured, one of two coacting members of each of one or more plug and socket couplings being secured at the periphery of each of the said panel-like members and the other of said two coacting members of each coupling being secured to the said framework the plug member of each coupling being arranged such that the blades thereof project peripherally in a direction normal to the direction in which the panel is presented to the framework, and the socket member of each coupling being arranged such that the recesses therein to receive the said contact blades extend into the said socket member in a direction parallel to the said direction in which the panel is presented to the framework. In another aspect of the invention the engagement and disengagement of the said two coacting members of each coupling by which the electrical connections between the electrical apparatus on the panel and appropriate conductors on the framework are made or broken is accomplished by a movement the direction of which is at right-angles to the plane of such panel-like members and at right-angles to the direction of projection of the blades from said plugs but parallel to the direction in which the recesses of the socket members extend into said socket members.

According to a further feature of the invention a mounting arrangement for electrical apparatus comprises a panel-like member to which the electrical apparatus is secured, a frame-like member to which said panel-like member is adapted to be detachably secured in abutting relationship at one or more parts of its periphery, one of two coacting members of each of one or more plug and socket couplings being secured to the periphery of said panel-like member and the other of said two coacting members of such coupling being secured to the frame-like member in such a position that when the panel-like member is secured to the frame-like member corresponding coacting members interengage by a lateral movement normal to the plane of the panel-like member to extend the electrical connections to said apparatus to the frame-like member.

The expression "panel-like" member as used herein means any structure however formed which serves as a substantially plane support for electrical equipment. This equipment may be mounted in the form of separate apparatus units arranged side-by-side so as to have each apparatus unit accessible when mounted, for instance it may consist of a plate on which the individual electrical apparatus units are mounted or it may mean a framework on which individual plates on which electrical components are mounted are in turn secured side-by-side on the framework. The panel-like support is conveniently rectangular but it could assume any desired shape.

The expression "frame-like" member used herein means any structure however formed which is provided with means for abutting against the side or sides of the panel-like member.

According to a further feature of the invention a plug and socket coupling for the mounting of electrical apparatus comprises coacting members of substantially rectangular section and having a blank side to permit of said members being secured to the periphery of a panel-like member and of a frame-like member respectively, one of the coacting members having projecting blades on the side opposite the blank side, while the other of the co-acting members has recesses into which the projecting blades are adapted to enter by movement in a direction parallel to the blank sides so that when fully engaged the remaining sides of said coacting members are substantially flush with one another while the sides opposite the blank sides substantially abut.

The invention will be better understood by referring to the accompanying drawings which illustrate the invention by way of example only.

In the drawings:

Figs. 2 and 3 show in perspective views one end of the panel-like member and one side of the vertical rack of Fig. 1 in greater detail.

Figure 1:
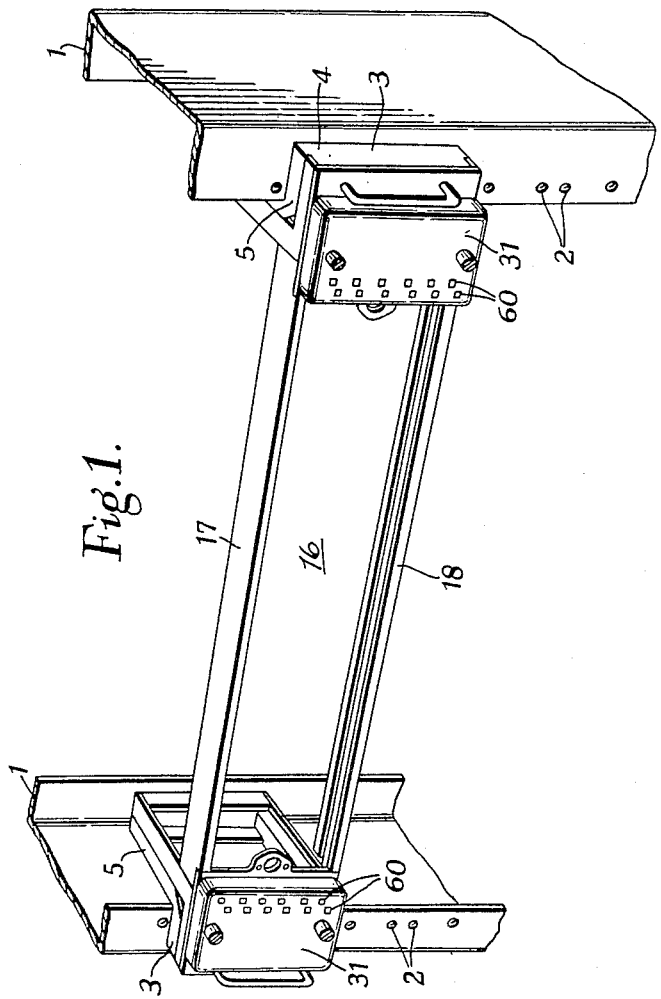
Fig. 1 shows in perspective view the arrangement for mounting a panel-like member carrying electrical apparatus to a vertical rack employing two plug and socket couplings for the electrical connections between the rack and the panel, one coupling at each end of this panel-like member.

Figs. 4, 5, 6, 7 and 9 illustrate one form of plug and socket coupling suitable for use with the arrangement as illustrated in Figs. 1, 2 and 3, and Figs. 4 and 5 show a plug and socket respectively in perspective view when disengaged.

Fig. 6 shows a front view when the plug and socket are engaged.

Fig. 7 shows a section on the line 7—7 of Fig. 6.

Fig. 8 shows a plan view of the panel-like member when secured to a vertical rack.

Fig. 9 shows a section on the broken line 9—9 of Fig. 6.

Figs. 10, 11, 12 and 13 show another form of plug and socket coupling suitable for use with the arrangement as illustrated in Figs. 1, 2 and 3.

Fig. 10 is a perspective view of the plug with the lower part removed.

Fig. 11 is a perspective view of the socket with the lower part removed.

Fig. 12 is a section through the plug and socket when coupled together on the line A—A of Figs. 10 and 11.

Fig. 13 is a section through the plug and socket when coupled together on the line B—B of Figs. 10 and 11.

Referring to Figs. 1, 2 and 3 the vertical supports 1 forming the rack are provided with two threaded fixing holes 2 for each panel to be mounted thereon. It will be understood that although only one panel is shown several could be provided mounted one above the other. By means of these fixing holes an assembly 3 including the socket 10 of a plug and socket coupling is secured in position. Socket 10 is shown detached from assembly 3 in Fig. 3. The assembly 3 includes a channel member 4 extending along the vertical rack 1 for a distance substantially equal to the height of the panel. The channel member 4 is provided with end plates 5 and 6, one at each end. The end plates 5 and 6 each carry a bracket of channel sections 7 and 8 respectively, rigidly secured thereto. The distance between the upper and lower side of the channel is arranged to correspond to the width of a projection 41 on each end of the socket body, so that the socket 10 may be slid therein and secured by screwing a plate 9 across the open end of the bracket. The end plates 5 and 6 are each formed of an inner plate 11 and an outer plate 12. The plates 11 and 12 are L-shaped, the larger limbs of the inner plates overlapping those of the outer plates so as to form a guide on the outer side of 5 while the shorter limbs extend across the channel member 4 in a somewhat different manner as shown. The inner plates 11 carrying the brackets 7 and 8 respectively are secured together at their free end by a metal strip 13, the end of which is overlapped by the outer plate; the pairs of plates 11 and 12 jointly form a single structure. The assembly 3 is secured to the rack 1 by screws 14 and 15 engaging in fixing holes 2 in an obvious manner.

The panel assembly 16 comprises two side channels 17 and 18 having secured thereto at each end L-shaped composite plates 19 and 20 corresponding to plates 5 and 6 respectively. Each of the plates 19 and 20 comprise outer plates 23 and inner plates 24. Both the inner and outer plates are L-shaped with the longer limbs overlapping, the longer limb of the outer plate being wider than that of the inner plate. Of the shorter limbs that of the inner plate fits into and is secured in a side channel 17 or 18, and also carries a bracket 25 of channel section adapted to take the projections 42 at the end of the plug body so that the plug may be rigidly secured by bolting plates across the open ends of the brackets. The short limbs of the outer plates project in a direction so as to form an extension of the side channels and have welded thereto a plate 26 having a handle 27 and a rectangular opening 28 which is adapted to embrace both the plug and socket coupling when in position. The plates 19 and 20 have welded thereto a cross plate 29 so that the plates 19, 20 and 26 form a structure rigid with the side channels 17 and 18.

When the socket and plug are secured in position in the assemblies 3 and 16 respectively and assembly 3 is secured to rack 1, the insertion and removal of a panel can be readily effected by pushing or pulling on the handle 27, the plates 5 and 6 and 19 and 20 acting as cooperating pairs of guide plates to ensure that the movement is normal to the plane of the panel. The side channels 17 and 18 conveniently serve for the mounting of a plurality of apparatus units side-by-side so that if each unit has a front plate substantially flush with the channels, the complete structure will resemble a panel.

It is to be noted that electrical connections are made from the apparatus mounted on the panel to the plug at the rear and that the conductors extending along the vertical racks make connection to the sockets also at the rear, while provision is made to enable soldered connections to be made at the front across the plug and socket connections if desired. Additional terminals 32 may be provided at the front of the plug to enable electrical tests to be made. The plugs have projecting blades 30 extending outwards from the plane of the panel and adapted to engage blades in recesses 54 in sockets adapted to take such projections, so that when the plug and socket are in position the rear sides and front side of these members are in alignment respectively, while the inward side, that is to say, the sides opposite to the abutting and interengaging sides of the plug and socket coupling are blank. The panel-like member is secured to the vertical rack 1 by screws 33, 34 which pass through holes 35 and 36 in plate 26 and recesses 37, 38 in channel 4 to screw into holes in vertical rack 1. A cover 31 serves to cover the plug and socket coupling when in position.

Two forms of plug and socket coupling suitable for use in panel mountings of the type described above will be described. One form of plug and socket coupling corresponds to that illustrated in Figs. 1–3 and 8 and will be described more particularly with reference to Figs. 4, 5, 6, 7 and 9. In these figures the socket is represented by the reference 39 and the plug by the reference 40. The bodies of the socket 39 and plug 40 consist of insulating material. They are both substantially in the shape of an elongated parallelepiped having at the ends projecting parts 41, 42 which enables them to be rigidly secured in position in channel members in the panel-like and frame-like members as already described. Of the other four sides of the parallelepiped the front side 43 of socket 39 and 44 of plug 40 respectively carry terminals. Front side 43 of the socket 39 carries soldering terminals 45 of which there is also one for each contact of the coupling. Front side 44 of plug 40 also carries a smaller number of spring terminals 47 formed of leaf springs spring pressed together to enable electrical connections to be made to selected contacts for testing purposes. Rear side 48 of socket 39 and rear side 49 of plug 40 also carry terminals to which permanent connections are made to conductors on the vertical rack and to the terminals of apparatus mounted on the panel respectively. Rear side 48 of socket 39 carries terminals 50 while rear side 49 of plug 40 carries terminals 51. The tags of terminal 50 are inclined in opposite directions to facilitate making connections. Other terminals could also be staggered if found desirable as is frequent practice in the art. The abutting sides 52 and 53 of the socket and plug respectively provide for the interengagement of contacts. Abutting side 52 of socket 39 is provided with a separate recess 54 for each contact the entrance of each recess being located on a shelf 55 facing the front of the plug, the shelf 55 being formed parallel to but apreciably back from the front side 43. Abutting side 53 of plug 40 is provided with contact blades 56 one for each contact of the plug, the contact blade 56 projecting at right angles to the abutting side 53, and are hook shaped so as to be adapted to enter the recesses 54 by a lateral movement, i. e. a movement of the plug from the front to the rear, normal to the front and parallel to the abutting sides 52 and 53 and to the opposite and remaining sides 57 and 58 which are blank sides, that is no electrical connections can be made thereto. The provision of these blank sides enables the plug and socket members to be mounted in the plane of respective mounting plates or their equivalent, e. g. the panel-like frame 19 and 20 and the vertical rack 1. All connections to the contacts of the coupling are made at the front or rear.

It will be seen from Figs. 7 and 9 how the individual contacts for the recesses and contact blades are formed. Terminals 50 and 45 and part of the contact 59 in each recess 54 are formed from a pair of right and left hand stampings with the projecting parts 50 and 45 preferably slightly curved so as to offer concave surfaces with respect to each other. The parts 59 are fitted with a beryllium copper contact so as to ensure an effective contact when blade 56 is inserted therebetween. The recesses 54 and the outer ends of contact 59 are so shaped as to facilitate entry of the blade 56 between the two parts 59. The method of assembling and securing the stampings in position will be clearly seen from Fig. 9. The body of the socket is formed in two parts so that the stampings may be placed in position in the lower part and secured by fixing the upper part in position. Similarly the parts 51, 46, 56 and part of 47 where provided may be made in a single stamping as shown in Fig. 7 and to some extent in Fig. 9. The part 47 where provided is made up of parts having surfaces concave with respect to each other, and caused to press together by a spring clip to ensure a good contact being made with any contact rod which may be inserted therein for testing purposes.

It will be appreciated that plug and socket couplings as described and mounted on panel-like and frame-like members are automatically caused to engage and disengage as the panel is located and secured to the frame member and removed therefrom. Movement must essentially be in a direction substantially at right angles to the plane of the panel.

When a panel-like member is mounted in position on a rack with the covers 31 mounted over the plug and socket couplings it will be noted that holes 60 in the covers enable connections to be made with the contacts 47 for testing purposes without removing the covers.

Referring to the alternative construction of plug and socket coupling Figs. 10, 12 and 13 show the plug consisting of a metallic frame 61 conveniently formed by a single stamping having two end plates 62 (of which one only is shown) joined by a side plate 63 which is provided with a slot 64 extending along its full length, the slot 64 being widened at its centre as shown in Fig. 13, to admit tongued insulating plates as described hereinafter. The end plates 62 have rectangular plates 66 brazed or otherwise rigidly secured thereto to provide means by which the plug may be secured in the panel-like portion as described with reference to Figs. 1, 2 and 3. A number of insulating plates 67 are provided on each side of a central block 68. The plates 67 are provided with a tongued portion 68ª with a neck 69 adapted to fit neatly in slot 64. The plates 67 are recessed at one side to take flat metallic members 70 each comprising a rectangular plate 71 for engaging with metallic members on the socket, tag strips 72 and 73 extending at right angles to the sides of plate 71 by which connections soldered thereto may be electrically connected to plate 71 and a socket member 75 extending parallel to the tag strips.

The flat metallic members 70 are not necessarily identical in structure in that the sockets 75 may be either of triangle formation to take a rod-like plug member or may consist of parallel leaves to take a flat plug. Again the position of the contact strips may be different in alternate insulating plates so as to stagger the soldering points. Consequently the recessed part of the insulating plates is conveniently made of uniform shape with widening of those parts of the recess which accommodate those portions of the members 70 which vary in a manner which will be well understood. Insulating end plates 76 resembling plates 67 but of modified construction without recesses are provided to insulate those members 70 which when the recess in which they are accommodated is such that they would otherwise face a metallic part of the frame. The central block 68 is provided with a central hole 77 in which a helical spring 78 is housed facing the two sets of insulating plates, respectively.

The plates 67 with the metallic members 70 are assembled alternately between the end plates 62 of the frame 61 by passing each plate 67 with its tongue 68ª through the enlarged part 65 of the slot 64 and sliding the neck 69 thereof along the slot as far as it will go. A metallic member 70 is inserted in the recess of each plate, care being taken to insert the particular design of metallic member required for the respective plates; finally a plate 76 is inserted and the assembly of one half of the plates is completed. The second half of the plates is inserted in a similar manner into the second half of the slot except in this case the plate 76 is inserted first so as to allow all the recessed portions of all the plates 67 to face in the same direction.

The central block 68 with the spring 78 suitably compressed is then inserted in position between the insulating plates of the two halves and is secured in position by a screw 79 and a plate 80.

When assembled it will be appreciated that the plates 67 and member 70 have a certain degree of freedom of movement along the slot, so as to enable the plates 71 to adapt their position when engaging the socket member as described hereinafter.

Referring to Figs. 11, 12 and 13 the socket consists of a metallic frame 81 conveniently formed of a single stamping having two end plates 82 (of which one only is shown) joined by a side plate 83.

The end plates 82 have rectangular plates 84 brazed or otherwise second thereto to provide means whereby the socket may be secured in position in the frame-like member as described in connection with Figs. 1, 2 and 3. The end plates 82 are also provided with correspondingly placed square slots 85 in which a square sectioned rod 86 is adapted to fit neatly.

Two sets of insulating plates 87 are provided symmetrically between and adjacent the end plates 82.

The plates 87 are rectangular with a depending portion 88 having a square shaped recess for fitting to the square rod 86. The plates 87 are champered at the side 89 remote from the dependent portion 88 so as to facilitate entry of the plates 71 of the plug between the plates 87. The plates 87 are also provided with recesses at both sides thereof. The recess at one side is provided to take a flat metallic member 90 having a square hole 91 through which projects a square sectional projection 92 of the plate. The recess at the other side is of square shaped section so positioned that when two plates are assembled in alignment the projection from one recess will fit neatly into the other recess.

The flat metallic members 90 are conveniently formed of single stampings having rectangular portions 93 projecting into part of the recess which is made shallower to ensure that the plates 71 will make good electrical contact with portions 93 and tag strips 94 and 95 projecting on opposite sides of square hole 91 and at right angles to the rectangular portion 93. The tag strips 94 and 95 are inclined in opposite directions and are conveniently of similar shape so that by reversing the members 90 for alternate plates 87 the soldering points may be staggered.

Centrally placed with respect to the end plates 82 are two rectangular metal plates 96 with depending portions 97 corresponding in shape to the plates 87. A tapered recess 98 is provided in each plate 96 which is deepest at the front, i. e. at the sides where the plates 71 (Fig. 10) enter between the plates 87 to engage with the flat metallic members 93 and is shallowest adjacent the square recess of the depending portion 97.

A wedge-shaped block 99 in which a threaded rod 100 freely rotates without longitudinal movement relative thereto is adapted to engage with its tapered sides, the tapered sides of the recesses in plates 96. The threaded rod 100 passes through a correspondingly threaded hole centrally placed in the square rod 86 and is provided with a slotted head 101 which is adapted when turned by a screwdriver or other means to cause the block 99 to approach to or recede from the rod 86 and thereby press or release the plates 87. Two separating members 102 with enlarged ends serve to keep the plates 96 a suitable distance apart. The separate members 102 are pushed home from opposite sides of plates 96 and are secured together by a nut and screw 103.

The method of assembly will be readily appreciated as it only slightly differs from the method of assembling the plug, the square rod 86 serving as a guide in place of the slot 64.

Prior to forcing home the plug of Fig. 10 in the socket of Fig. 11, the wedge shaped block 99 is released so as to give the plates 87 a certain degree of freedom; the plates 71 are then forced between the plates 87 until they make contact with the projections 93, then the wedge shaped block may be caused to press the plates 87 together and ensure a most reliable electrical connection between plates 71 and 93. It is to be noted that the head 101 faces the front of the socket so that the pressure between the contacts can be controlled from the front of the panel. It will be noted that both the plug and socket have a blank side which is opposite to the abutting sides at which the contacts engage, and that the electrical connections are adapted to be made to the other two sides.

We claim:

1. In a rack and panel mounting arrangement for electrical apparatus, a plurality of plug and socket couplings each comprising a plug body and a socket body of rectangular parallelepiped shape, one of which is secured to the rack and the other to the panel, said plug and said socket body lying side-by-side in a plane parallel to the front plane of the panel when the latter is assembled to the rack, conducting sockets in said socket body extending in a direction normal to said plane, and parallel spaced conducting blades carried by said plug body, said blades having an external limb extending in line with said sockets, an oppositely directed limb inside the plug body and an intermediate portion extending in a direction at right-angles to the direction of said sockets.

2. In a vertical rack and panel mounting arrangement for electrical apparatus, a plurality of plug and socket couplings each comprising a plug body and a socket body of rectangular parallelepiped shape, one of which is secured to the panel and the other to the rack, said panel being assembled to the rack by linear horizontal movement normal to the plane of the panel to bring said plug and socket body side-by-side, said socket body having conducting sockets extending in horizontal planes parallel to the direction of said line of assembly, and said plug body being divided in a vertical plane into two portions, at least one portion having horizontally extending recesses to locate conducting blades therein, each of said blades comprising a stamping having internal limbs fitting the said recesses inside said plug body, an external limb entering one of said conducting sockets, and an interconnecting portion joining said internal and external limbs, said plug body portions being secured together to hold said conducting blades in position.

3. In a rack and panel mounting arrangement for electrical apparatus, guide members mounted respectively on the rack and panel for ensuring assembly of the panel to the rack by horizontal rectilinear movement normal to the plane of the panel, a plurality of two-part plug and socket couplings for making connection between equipment carried on the panel and cable conductors carried on the rack by said assembling movement of the panel to the rack, each half of said plug and socket couplings comprising two body portions of insulating material having a plurality of recesses, and multi-limbed conducting contact members of corresponding shape housed in horizontal parallel spaced relation partly in the said recesses of one of said body portions and partly in the said recesses of the other body portion, the conducting contact members of one half coupling having limbs extending parallel to the said line of assembly of the panel to the rack and the contact members of the complementary half coupling having limbs parts of which extend laterally to the said line of assembly to interengage with the said limbs of the contact members of the first half coupling, and the respective body portions of said half couplings being secured together to retain said conducting contact members in the said recesses while allowing a limited degree of float of the contact members when the couplings are made.

4. In a rack and panel mounting arrangement for electrical apparatus consisting of a pair of vertical supports forming a rack bay and a plurality of demountable panels extending across the width of said bay, guiding members secured to said rack and panel respectively for assembling said panel to the rack solely by horizontal rectilinear movement, and a plurality of two-part plug and socket couplings each having a coupling member on the panel and a coupling member on the rack mutually engageable by the said horizontal rectilinear movement to bring the two members of each coupling into side-by-side relation, each coupling member comprising two insulating body portions having recesses formed therein in parallel spaced relation and multi-limbed conducting contact elements housed partly in the recesses of one of said body portions and partly in the recesses of the other body portion, the conducting contact elements of one of said coupling members having limbs extending in parallel spaced relation in the line of engagement of the panel to the rack, and the conductive contact elements housed in the other coupling member having portions extending therefrom in a direction laterally of the said line of engagement to interengage with the parallel contact elements of the other coupling member, the two body portions of each coupling member being secured together to retain the contact elements in their respective positions but to allow a limited degree of float during interengagement of said elements.

References Cited in the file of this patent

UNITED STATES PATENTS

| | | |
|---|---|---|
| 1,809,025 | Cruser | June 9, 1931 |
| 1,917,009 | Betts et al. | July 4, 1933 |
| 2,120,103 | Linde | June 7, 1938 |
| 2,127,473 | Sacco | Aug. 16, 1938 |
| 2,281,958 | Snavely | May 5, 1942 |
| 2,326,327 | Brewer | Aug. 10, 1943 |
| 2,405,180 | Blattner et al. | Aug. 6, 1946 |
| 2,440,270 | Hecht | Apr. 27, 1948 |
| 2,512,908 | Arndt | June 27, 1950 |
| 2,606,233 | Schymik | Aug. 5, 1952 |

FOREIGN PATENTS

| | | |
|---|---|---|
| 632,856 | Great Britain | Dec. 5, 1949 |
| 632,857 | Great Britain | Dec. 5, 1949 |
| 963,994 | France | Jan. 18, 1950 |